United States Patent
Malik et al.

(10) Patent No.: US 10,862,514 B2
(45) Date of Patent: Dec. 8, 2020

(54) DUAL-BAND CONCURRENT TRANSCEIVER

(71) Applicant: QUALCOMM Incorporated, San Diego, CA (US)

(72) Inventors: Rahul Malik, San Diego, CA (US); Jeremy Dunworth, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/353,779

(22) Filed: Mar. 14, 2019

(65) Prior Publication Data

US 2019/0319649 A1    Oct. 17, 2019

Related U.S. Application Data

(60) Provisional application No. 62/656,870, filed on Apr. 12, 2018.

(51) Int. Cl.
| | |
|---|---|
| *H04B 1/38* | (2015.01) |
| *H04B 1/00* | (2006.01) |
| *H04B 7/0426* | (2017.01) |
| *H04B 7/0408* | (2017.01) |

(52) U.S. Cl.
CPC ......... *H04B 1/0064* (2013.01); *H04B 1/0067* (2013.01); *H04B 7/043* (2013.01); *H04B 7/0408* (2013.01)

(58) Field of Classification Search
CPC .. H04B 1/0064; H04B 1/0067; H04B 7/0408; H04B 7/043; H04B 1/005
See application file for complete search history.

(56) References Cited

U.S. PATENT DOCUMENTS

| | | | |
|---|---|---|---|
| 6,307,519 B1 | 10/2001 | Livingston et al. | |
| 8,587,492 B2 | 11/2013 | Runyon | |
| 9,374,123 B2* | 6/2016 | Schmidhammer | H04B 1/44 |
| 9,444,140 B2* | 9/2016 | Maltsev | H01Q 3/34 |
| 9,761,937 B2 | 9/2017 | Runyon et al. | |
| 2017/0250725 A1* | 8/2017 | Wei | H04B 1/40 |
| 2018/0019516 A1* | 1/2018 | Teague | H04B 7/18504 |
| 2018/0324853 A1* | 11/2018 | Jeon | H04W 52/325 |
| 2018/0375570 A1* | 12/2018 | Lofquist | H04W 16/28 |

OTHER PUBLICATIONS

Mondal S., et al., "A 25-30 GHz 8-Antenna 2-Stream Hybrid Beamforming Receiver for MIMO Communication", 2017 IEEE Radio Frequency Integrated Circuits Symposium, 2017, pp. 112-115.
Pozar D.M., et al., "A Shared-Aperture Dual-Band Dual-Polarized Microstrip Array," IEEE Transactions on Antennas and Propagation, Feb. 2001, vol. 49, No. 2, pp. 150-157.

* cited by examiner

*Primary Examiner* — Tuan Pham
(74) *Attorney, Agent, or Firm* — Qualcomm Incorporated/Seyfarth Shaw LLP (57) ABSTRACT

A radio frequency (RF) architecture performs simultaneous beamforming to two different gigabit node Bs (gNBs) using an independent set of phase shifters. The beamforming process includes simultaneously communicating across a shared antenna aperture in a first frequency and a second frequency. The beamforming process also includes configuring a first beam for the first frequency and a second beam for the second frequency before communicating with the first frequency and/or the second frequency to synchronize communication between the first frequency and the second frequency across the shared antenna aperture.

23 Claims, 10 Drawing Sheets

DUAL-BAND CONCURRENT TRANSCEIVER

CROSS-REFERENCE TO RELATED APPLICATION

The present application claims the benefit of U.S. Provisional Patent Application No. 62/656,870, filed on Apr. 12, 2018, and titled "DUAL-BAND CONCURRENT MILLIMETER WAVE TRANSCEIVER," the disclosure of which is expressly incorporated by reference herein in its entirety.

TECHNICAL FIELD

The present disclosure generally relates to fifth generation (5G) radio frequency (RF) front-ends. More specifically, the present disclosure relates to an architecture for a dual-band concurrent millimeter wave transceiver.

BACKGROUND

The design complexity of mobile RF transceivers is complicated by added circuit function and devices to support communication enhancements. For example, advances in technology have resulted in cellular communication standards and protocols, such as 5G new radio (NR) millimeter wave using physically small antenna arrays that contain multiple antenna elements. The complexity is further heightened by the desire to support multiple frequency bands in the millimeter wave frequency range, such as frequency bands located near 24 gigahertz (GHz), 26 GHz, 28 GHz, 37 GHz, 39 GHz, 48 GHz, and 56 to 71 GHz.

SUMMARY

In an aspect of the present disclosure, a method for wireless communications is described. The method includes simultaneously communicating across a shared antenna aperture in a first frequency and a second frequency. The method further includes configuring a first beam for the first frequency and a second beam for the second frequency before communicating with the first frequency and/or the second frequency to synchronize communication between the first frequency and the second frequency across the shared antenna aperture.

In an aspect of the present disclosure, an apparatus for wireless communications is described. The apparatus includes a memory, a transceiver configured for wireless communication and at least one processor coupled to the memory and the transceiver. The processor(s) is configured to simultaneously communicate across a shared antenna aperture in a first frequency and a second frequency. The processor(s) also configures a first beam for the first frequency and a second beam for the second frequency before communicating with the first frequency and/or the second frequency to synchronize communication in the first frequency and in the second frequency across the shared antenna aperture.

In another aspect of the present disclosure, an apparatus for wireless communications is described. The apparatus includes means for simultaneously communicating across a shared antenna aperture in a first frequency and a second frequency. The apparatus further includes means for configuring a first beam for the first frequency and a second beam for the second frequency before communicating with the first frequency and/or the second frequency to synchronize communication in the first frequency and in the second frequency across the shared antenna aperture.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts. As described herein, the use of the term "and/or" is intended to represent an "inclusive OR", and the use of the term "or" is intended to represent an "exclusive OR".

Currently developing next generation cellular technologies (e.g., 5G) in millimeter wave (mmW) bands desire low cost phased-array transceivers. In antenna theory, a phased array usually means an electronically scanned array, a computer-controlled array of antennas that creates a beam of radio waves that can be electronically steered to point in different directions, without moving the antennas. In an array antenna, the radio frequency signal from the transmitter is fed to the individual antennas with the correct phase relationship so the radio waves from the separate antennas add together to increase the radiation in a desired direction in the far field, while cancelling to suppress radiation in undesired directions in the far field. Because the array includes many antennas (sometimes thousands) to achieve high antenna array gain, phased arrays become more practical as the frequency increases and the individual antenna element size becomes smaller.

Even with the benefit of beam forming, due to space constraints in a mobile form factor, increasing transmit output power while maintaining acceptable power added efficiency (PAE) of a power amplifier (PA), noise factor (NF) of a low noise amplifier (LNA), and overall transceiver power consumption, it is important to maximize link budget allowable path loss and to minimize handset case temperature. Additionally, the phased-array transceiver can be specified to support dual polarization communication.

It is currently anticipated that a single mmW band/carrier may be paired with multiple low-band carriers using either carrier aggregation or dual connectivity options. However, it is desirable to simultaneously pair multiple mmW bands/carriers (e.g., between thirty-seven (37) gigahertz (GHz) shared spectrum and thirty-nine (39) GHz licensed spectrum). These may result in different beams due to (a) the use of physically separate transmitters; or (b) different propagation environments. However, given the space constraints on a user equipment (UE) and the closeness in frequencies, a single set of antennas may be used.

Aspects of the present disclosure are directed to a radio frequency (RF) architecture that performs simultaneous beamforming to two different gigabit node Bs (gNBs) using an independent set of phase shifters. In one aspect, a user equipment may simultaneously communicate across a shared antenna aperture in a first frequency (e.g., first millimeter wave frequency) and a second frequency (e.g., a second millimeter wave frequency). For example, simultaneous beamforming of the 37 GHz shared spectrum associated with the first gNB and the 39 GHz licensed spectrum associated with the second gNB may be achieved using an independent set of phase shifters for independent beamforming. The simultaneous communications may include sharing an antenna array between the first frequency and the second frequency.

The single antenna aperture is used for communicating in the first frequency across the entire aperture and for communicating in the second frequency across the entire aperture rather than partitioning the aperture between the first frequency and the second frequency. A first beam for the first frequency and a second beam for the second frequency are configured before communicating with the first frequency and/or the second frequency to synchronize communication in the first frequency and in the second frequency across the shared antenna aperture. The configuring may be performed by a processor/controller or the digital circuit described herein.

Configuring the first beam for the first frequency and the second beam for the second frequency includes determining a time to steer the first beam and synchronizing steering of the second beam with steering of the first beam. The steering includes steering of the first beam and the second beam at a same time when both the first frequency and the second frequency are being received. In some aspects, the steering also includes steering the first beam when the second frequency is not receiving.

In the aspects of the present disclosure, a digital circuit (e.g., digital hardware circuit) can switch a phase, a gain, one or more bias settings, or ensure that a transmit/receive (Tx/Rx) mode is synchronized between the two channels associated with the first beam and the second beam. For example, the digital circuit may schedule or control changes to the gain, phase, biases etc., in a timed-manner to allow for synchronous changes to the beam direction between a first channel (e.g., channel 1) and a second channel (e.g., channel 2).

Equivalent isotropically radiated power (EIRP) specifications may limit transmission to one band/channel at a time. For example, because of the EIRP constrained settings on a UE, only one of the bands/channels may transmit at a given time. However, both bands may be used to receive simultaneously. In the absence of sufficient inter-band isolation, receive beam switching may be coordinated across bands.

In non-EIRP constrained applications, simultaneous transmission on both bands may also be allowed. Further coordination of beam switch times and durations across bands may also be implemented.

In one aspect, the multi-band (e.g., dual-band) concurrent millimeter wave (mmW) transceiver (e.g., transceiver 220 or 222 of FIG. 2) may be included in a user equipment or wireless device. Alternatively, the multi-band (e.g., dual-band) concurrent millimeter wave (mmW) transceiver may be included in a base station such as the base station 132 shown in FIG. 1. The base station may also be called a small cell or access point (AP).

Figure 1:
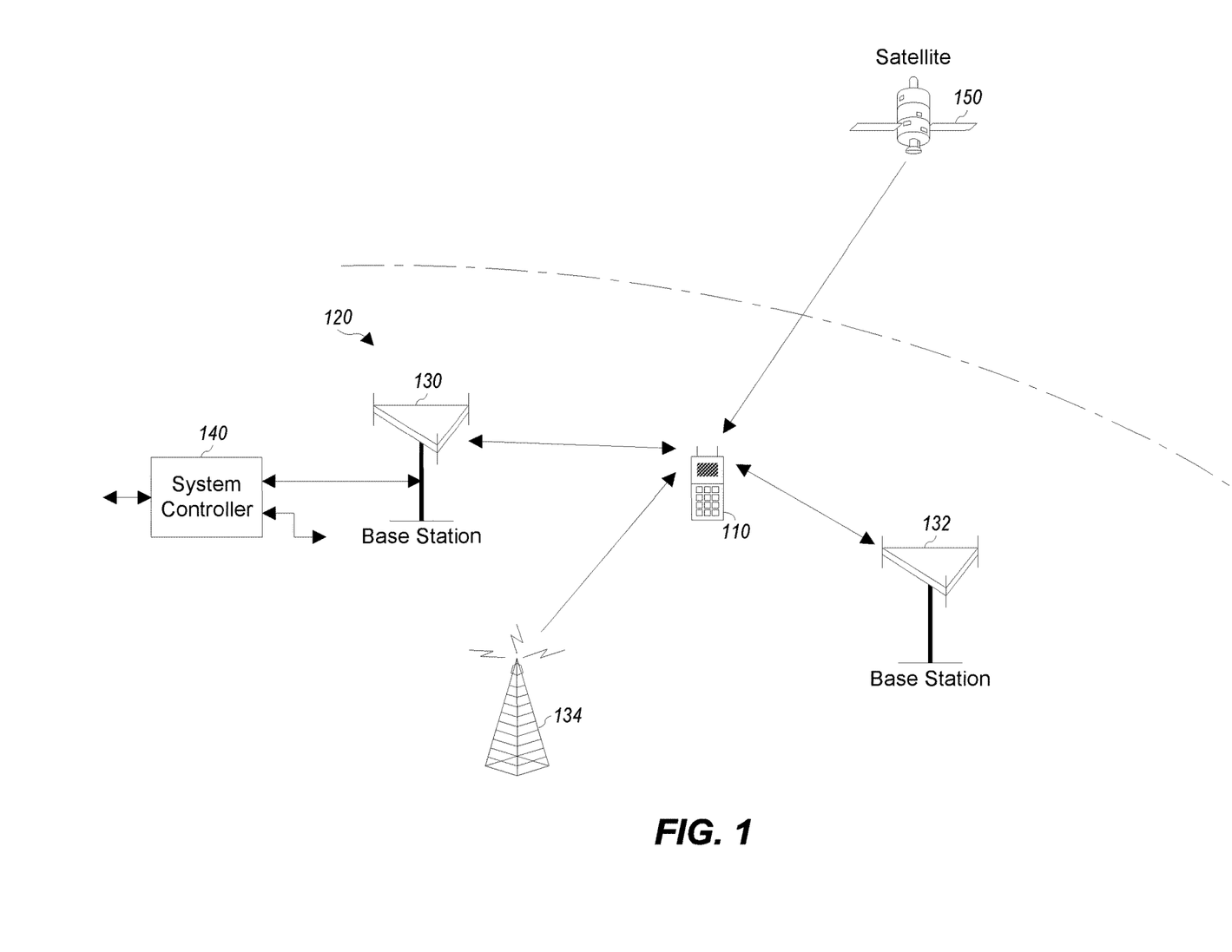
FIG. 1 shows a wireless device communicating with a wireless communications system.

FIG. 1 shows a wireless device 110 communicating with a wireless communications system 120. The wireless device 110 includes a multi-band (e.g., dual-band) concurrent millimeter wave (mmW) transceiver. The wireless communications system 120 may be a 5G system, a long term evolution (LTE) system, a code division multiple access (CDMA) system, a global system for mobile communications (GSM) system, a wireless local area network (WLAN) system, millimeter wave (mmW) technology, or some other wireless system. A CDMA system may implement wideband CDMA (WCDMA), time division synchronous CDMA (TD-SCDMA), CDMA2000, or some other version of CDMA. In a millimeter wave (mmW) system, multiple antennas are used for beamforming (e.g., in the range of 30 GHz, 60 GHz, etc.). For simplicity, FIG. 1 shows the wireless communications system 120 including two base stations 130 and 132 and one system controller 140. In general, a wireless system may include any number of base stations and any number of network entities.

A wireless device 110 may be referred to as a user equipment (UE), a mobile station, a terminal, an access terminal, a subscriber unit, a station, etc. The wireless device 110 may also be a cellular phone, a smartphone, a tablet, a wireless modem, a personal digital assistant (PDA), a handheld device, a laptop computer, a Smartbook, a netbook, a cordless phone, a wireless local loop (WLL) station, a Bluetooth device, etc. The wireless device 110 may be capable of communicating with the wireless communications system 120. The wireless device 110 may also be capable of receiving signals from broadcast stations (e.g., a broadcast station 134), signals from satellites (e.g., a satellite 150) in one or more global navigation satellite systems (GNSS), etc. The wireless device 110 may support one or more radio technologies for wireless communications such as 5G, LTE, CDMA2000, WCDMA, TD-SCDMA, GSM, 802.11, etc.

The wireless device 110 may support carrier aggregation, which is operation on multiple carriers. Carrier aggregation may also be referred to as multi-carrier operation. According to an aspect of the present disclosure, the wireless device 110 may be able to operate in low-band from 698 to 960 megahertz (MHz), mid-band from 1475 to 2170 MHz, and/or high-band from 2300 to 2690 MHz, ultra-high band from 3400 to 3800 MHz, and long-term evolution (LTE) in LTE unlicensed bands (LTE-U/LAA) from 5150 MHz to 5950 MHz. Low-band, mid-band, high-band, ultra-high band, and LTE-U refer to five groups of bands (or band groups), with each band group including a number of frequency bands (or simply, "bands"). For example, in some systems each band may cover up to 200 MHz and may include one or more carriers. For example, each carrier may cover up to 40 MHz in LTE. Of course, the range for each of the bands is merely exemplary and not limiting, and other frequency ranges may be used. LTE Release 11 supports 35 bands, which are referred to as LTE/UMTS bands and are listed in 3GPP TS 36.101. The wireless device 110 may be configured with up to five carriers in one or two bands in LTE Release 11.

Some carrier aggregation implementations using sub 6 GHz frequency bands may also include multiple frequency bands in the millimeter wave frequency range, such as frequency bands located near 24 gigahertz (GHz), 26 GHz, 28 GHz, 37 GHz, 39 GHz, 48 GHz, and 56 to 71 GHz. For example, these bands may include 24.25-24.45 GHz, 24.75-25.25 GHz, 27.5-28.35 GHz, 37-40 GHz, 40-43.5 GHz and 47.2-48.2 GHz. In these systems, the carriers may be 50 MHz, 100 MHz, 200 MHz, or 400 MHz and the bands may be up to 2.4 GHz or more and may include one or more carriers.

Figure 2:
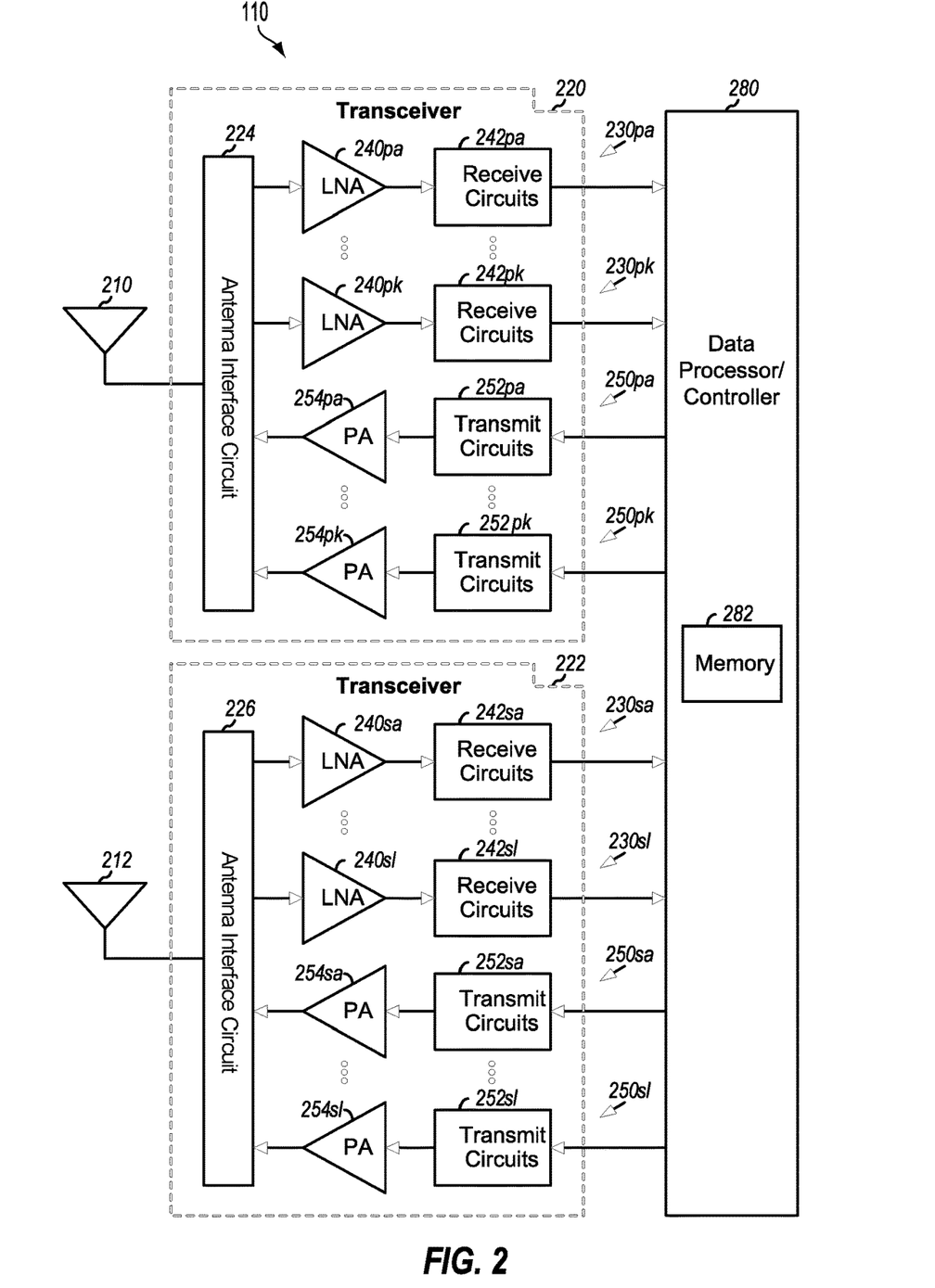
FIG. 2 shows a block diagram of the wireless device in FIG. 1, according to an aspect of the present disclosure.

FIG. 2 shows a block diagram of an exemplary design of the wireless device 110 in FIG. 1. In this exemplary design, the wireless device 110 includes a transceiver 220 coupled to a primary antenna 210, a transceiver 222 coupled to a secondary antenna 212, and a data processor/controller 280. The transceiver 220 includes multiple (K) receivers 230pa to 230pk and multiple (K) transmitters 250pa to 250pk to support multiple frequency bands, multiple radio technologies, carrier aggregation, etc. The transceiver 222 includes L receivers 230sa to 230sl and L transmitters 250sa to 250sl to support multiple frequency bands, multiple radio technologies, carrier aggregation, receive diversity, multiple-input multiple-output (MIMO) transmission from multiple transmit antennas to multiple receive antennas, etc.

In the exemplary design shown in FIG. 2, each receiver 230 includes an LNA 240 and receive circuits 242. For data reception, the antenna 210 receives signals from base stations and/or other transmitter stations and provides a received radio frequency (RF) signal, which is routed through an antenna interface circuit 224 and presented as an input RF signal to a selected receiver 230. An antenna interface circuit 224 may include switches, duplexers, transmit filters, receive filters, matching circuits, etc. The description below assumes that the receiver 230pa is the selected receiver. Within the receiver 230pa, an LNA 240pa amplifies the input RF signal and provides an output RF signal. Receive circuits 242pa downconvert the output RF signal from RF to baseband, amplify and filter the downconverted signal, and provide an analog input signal to data processor 280. Receive circuits 242pa may include mixers, filters, amplifiers, matching circuits, an oscillator, a local oscillator (LO) generator, a phase locked loop (PLL), etc. Each remaining receiver 230 in the transceivers 220 and 222 may operate in a similar manner as the receiver 230pa.

In the exemplary design shown in FIG. 2, each transmitter 250 includes transmit circuits 252 and a power amplifier (PA) 254. For data transmission, a data processor 280 processes (e.g., encodes and modulates) data to be transmitted and provides an analog output signal to a selected transmitter. The description below assumes that the transmitter 250pa is the selected transmitter. Within the transmitter 250pa, transmit circuits 252pa amplify, filter, and upconvert the analog output signal from baseband to RF and provide a modulated RF signal. The transmit circuits 252pa may include amplifiers, filters, mixers, matching circuits, an oscillator, an LO generator, a PLL, etc. A power amplifier (PA) 254pa receives and amplifies the modulated RF signal and provides a transmit RF signal having the proper output power level. The transmit RF signal is routed through the antenna interface circuit 224 and transmitted via the antenna 210. Each remaining transmitter 250 in the transceivers 220 and 222 may operate in a similar manner as the transmitter 250pa.

FIG. 2 shows an exemplary design of a receiver 230 and transmitter 250. The receiver 230 and a transmitter 250 may also include other circuits not shown in FIG. 2, such as filters, matching circuits, etc. All or a portion of transceivers 220 and 222 may be implemented on one or more analog integrated circuits (ICs), RF ICs (RFICs), mixed-signal ICs, etc. For example, LNAs 240 and receive circuits 242 within transceivers 220 and 222 may be implemented on multiple ICs, as described below. The circuits in transceivers 220 and 222 may also be implemented in other manners.

The data processor/controller 280 may perform various functions for the wireless device 110. For example, the data processor 280 may perform processing for data being received via the receivers 230 and data being transmitted via the transmitters 250. The controller 280 may control the operation of the various circuits within the transceivers 220 and 222. In some aspects, the transceivers 220 and 222 may also comprise a controller to control various circuits within the respective transceiver (e.g., LNAs 240). A memory 282 may store program codes and data for the data processor/controller 280. The data processor/controller 280 may be implemented on one or more application specific integrated circuits (ASICs) and/or other ICs.

In some implementations, the LNAs and PAs of the exemplary transceiver 220 and/or the exemplary transceiver 222 of FIG. 2 may also be implemented as one or more arrays of LNAs and PAs for a phased-array transceiver (e.g., as described with reference to FIG. 6). Phased-array transceivers are used for higher frequency communication such as 30 GHz and 60 GHz to achieve the benefits of beam forming.

Figure 3A:
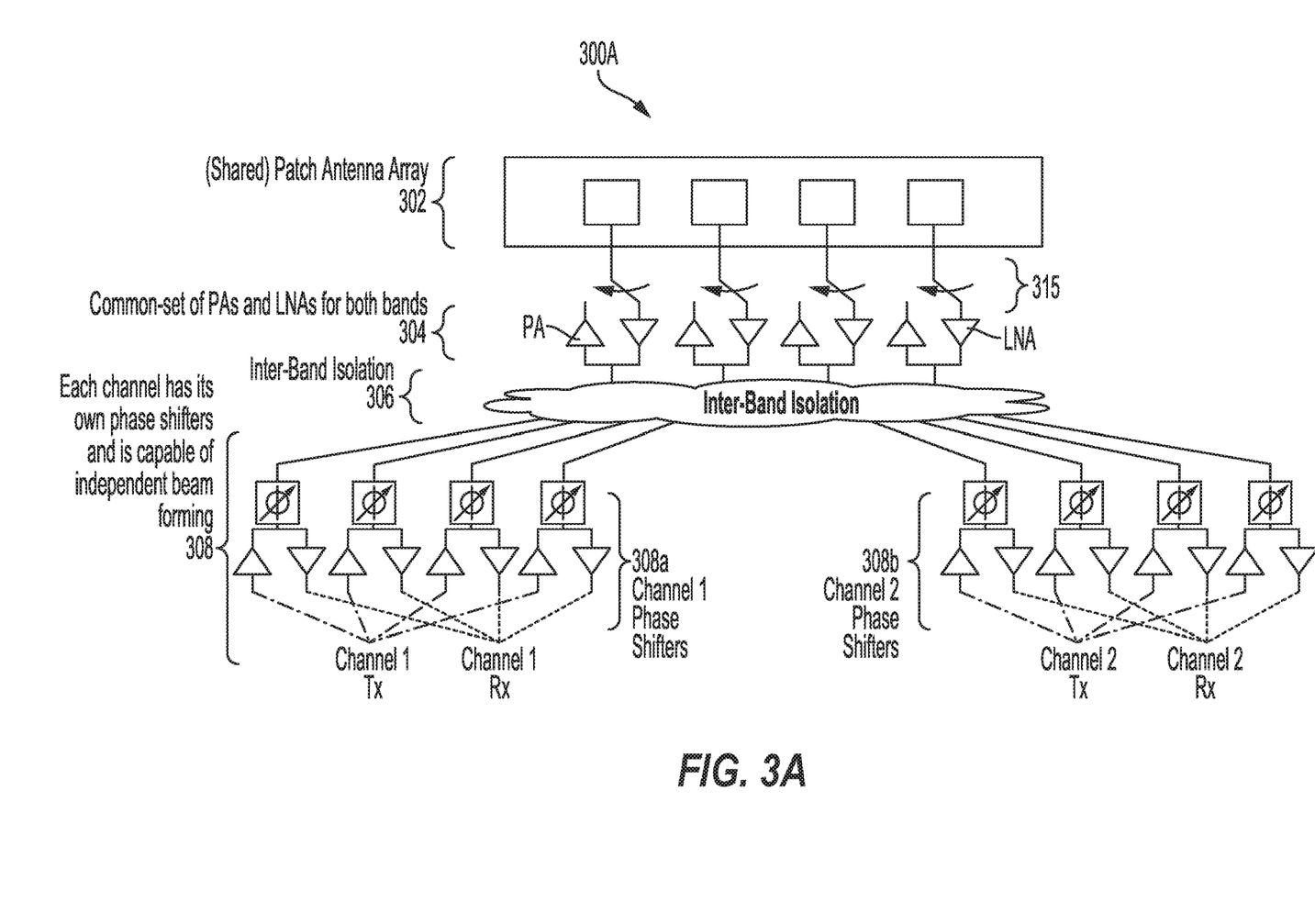
FIGS. 3A-3C illustrate architectures for a multi-band (e.g., dual-band) concurrent millimeter wave (mmW) transceiver according to aspects of the present disclosure.

FIG. 3A illustrates an architecture for a multi-band (e.g., dual-band) concurrent millimeter wave (mmW) transceiver 300A. The dual-band concurrent mmW transceiver 300A includes an antenna array 302, such as a patch antenna array, shared between the multiple bands. The dual-band concurrent mmW transceiver 300A further includes a common set of amplifiers 304 including power amplifiers and low noise amplifiers for both bands and a set of transmit/receive (Tx/Rx) switches 315 coupled to the common set of amplifiers 304. The transmit/receive (Tx/Rx) switches 315 are configured to switch between transmission and reception. For example, during reception, the transmit/receive (Tx/Rx) switches 315 connect or couple the low noise amplifiers (LNAs) of the common set of amplifiers 304 to the antenna array 302. During transmission, the transmit/receive (Tx/Rx) switches 315 connect or couple the power amplifiers (PAs) of the common set of amplifiers 304 to the antenna array 302. The dual-band concurrent mmW transceiver 300A also includes an inter-band isolation device 306 configured to provide isolation between the different bands. The inter-band isolation implementation is optional. In some aspects, the inter-band isolation may be implemented between phase shifting and amplification of a signal being received or transmitted.

Example implementations of the inter-band isolation 306 include frequency specific filters that act as duplexers and buffer amplifiers. In the duplexer example, the inter-band isolation is achieved because a pair of filters have complementary pass band and stop bands. For example, in the duplexer, one filter may pass 28 GHz and stop 39 GHz and the other filter in the duplexer may stop 28 GHz and pass 39 GHz. In an exemplary implementation, both filters in the duplexer provide attenuation between and outside desired millimeter wave frequency bands. In the example of buffer amplifiers, a parallel set of receive (RX) amplifiers split the received signal into two approximately equal portions and then independently buffer the signal to the channel 1 and channel 2 phase shifters in the receive (RX) mode and another parallel set of transmit (TX) amplifiers independently buffer and then combine the signal from the channel 1 and channel 2 phase shifters. In both cases, the inter-band isolation is achieved by the reverse isolation of the buffer amplifiers. The buffer amplifier example is more likely to be used when separate phase shifters are used for receive and transmit.

For example, when receiving, the inter-band isolation occurs after the amplification (by the common set of amplifiers 304) and before the phase shifting (by phase shifters 308). A first band/channel may be allocated a first set of phase shifters 308a and a second band/channel may be allocated a second set of phase shifters 308b. The phase shifting may be achieved with set of amplifiers, as illustrated in FIG. 3A. Whether inter-band isolation 306 is present, coordination of beam switching across bands may be conducted to achieve synchronization to prevent a transient on one channel's phase shifters or amplifiers from impacting the other channel. Each channel may be allocated a phase shifter 308 for independent beamforming. For example, the switching of phase shifters (e.g., the first set of phase shifters 308a and the second set of phase shifters 308b) and/or VGA (when included) to change the beam direction should be synchronized between channel 1 and channel 2. Channel 1 may be a licensed band and channel 2 may be an unlicensed band.

Phase shifters 308a and 308b may be implemented by any kind of phase shifting circuit, including but not limited to active phase shifters, vector modulators, passive phase shifters, reflection type phase shifters, and mixer based phase shifters where the LO phase is controlled and the signal is shifted in phase during the conversion from intermediate frequency (IF) to radio frequency (RF), or vice versa. In the case of mixer or LO based phase shifters, the intermediate frequency (IF), could be a zero intermediate frequency (ZIF) also sometimes called direction conversation as the signal is directly converted between RF and analog baseband and vice versa.

In one aspect, a single antenna aperture of the antenna array 302 is used for communicating in a first frequency (e.g., the first band/channel) across the entire aperture and for communicating in a second frequency (e.g., the second band/channel) across the entire aperture rather than partitioning the aperture between the first frequency and the second frequency.

Figure 3B:
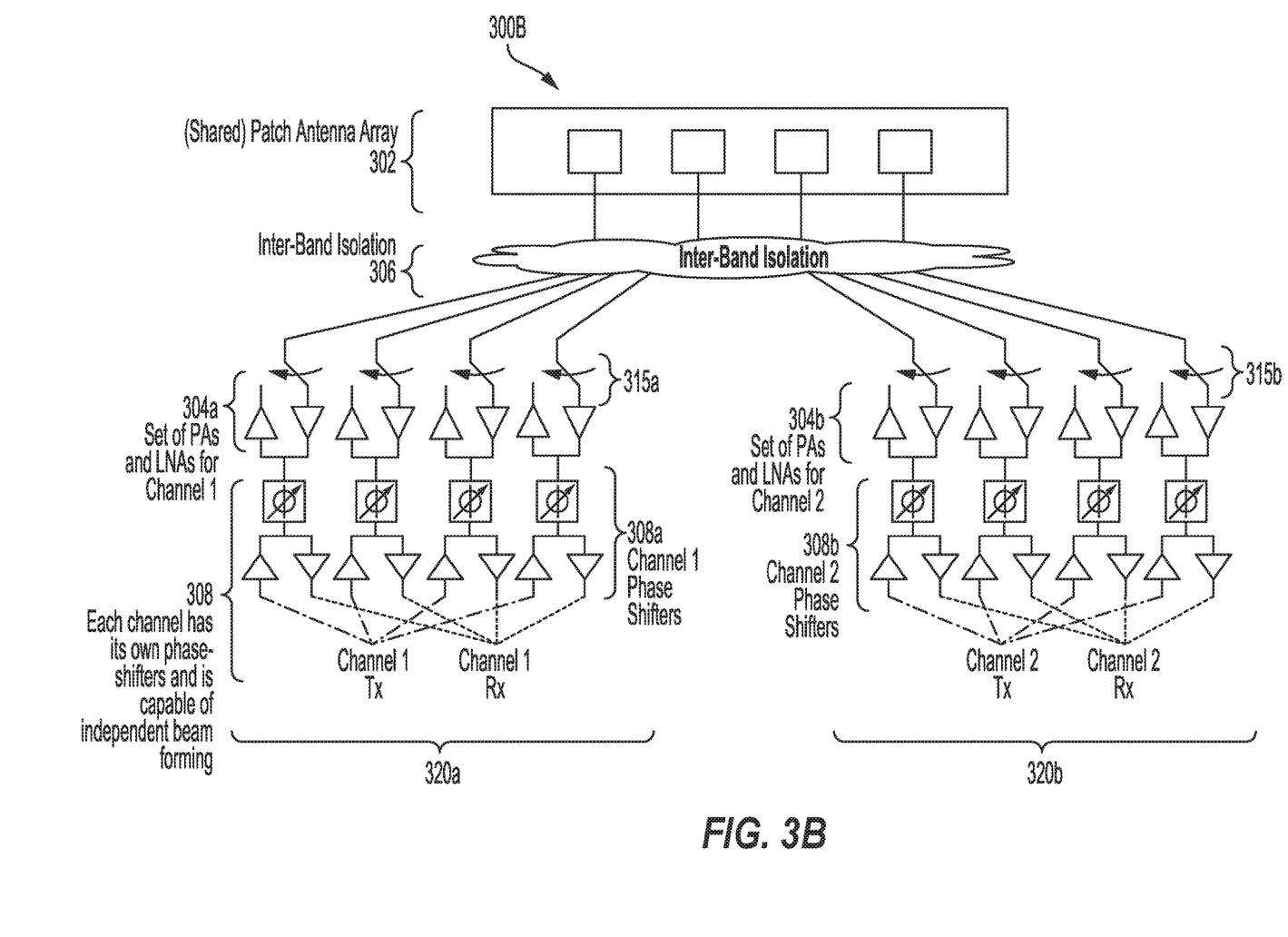

FIG. 3B illustrates an architecture for another multi-band (e.g., dual-band) concurrent millimeter wave (mmW) transceiver 300B. For illustrative purposes, some of the labelling and numbering of the devices and features of FIG. 3B are similar to those of FIG. 3A. When sufficient isolation between the transmitter (Tx) and the receiver (Rx) can be realized as is specified for full duplex communications, the architecture of FIG. 3A may be extended to allow for simultaneous independent transmission and reception as illustrated in FIG. 3B. In this implementation, each channel has its own independent power amplifiers (PAs) and low noise amplifiers (LNAs) as well as independent sets of transmit/receive (Tx/Rx) switches and is capable of independent beamforming. For example, the first band/channel may be allocated a first set of amplifiers 304a and a second band/channel may be allocated a second set of amplifiers 304b. The first band/channel may be allocated a first set of transmit/receive (Tx/Rx) switches 315a and a second band/channel may be allocated a second set of transmit/receive (Tx/Rx) switches 315b. Optionally, the inter-channel isolation may be improved by using inter band isolation, such as a diplexer or band specific filters that function as a two-port splitter with a higher inter-port isolation.

The dual-band concurrent mmW transceiver 300B may achieve multiple simultaneous or concurrent transmit-receive configurations based on the isolation performance. For example, the dual-band concurrent mmW transceiver 300B may achieve all of the following concurrent communication configurations:

concurrently transmitting in a first band/channel 320a and transmitting in a second band/channel 320b (Tx, Tx);
concurrently receiving in the first channel 320a and receiving in the second channel 320b (Rx, Rx);
concurrently transmitting in the first channel 320a and receiving in the second channel 320b (Tx, Rx); and
concurrently receiving in the first channel 320a and transmitting in the second channel 320b (Rx, Tx).

In some aspects, the concurrent transmitting and receiving (e.g., (Tx, Rx) or (Rx, Tx)) may be achieved with reduced transmit or receive chain devices. For example, concurrent transmitting and receiving may be achieved by eliminating a set of power amplifiers and low noise amplifiers as well as a set of transmit/receive (Tx/Rx) switches.

Figure 3C:
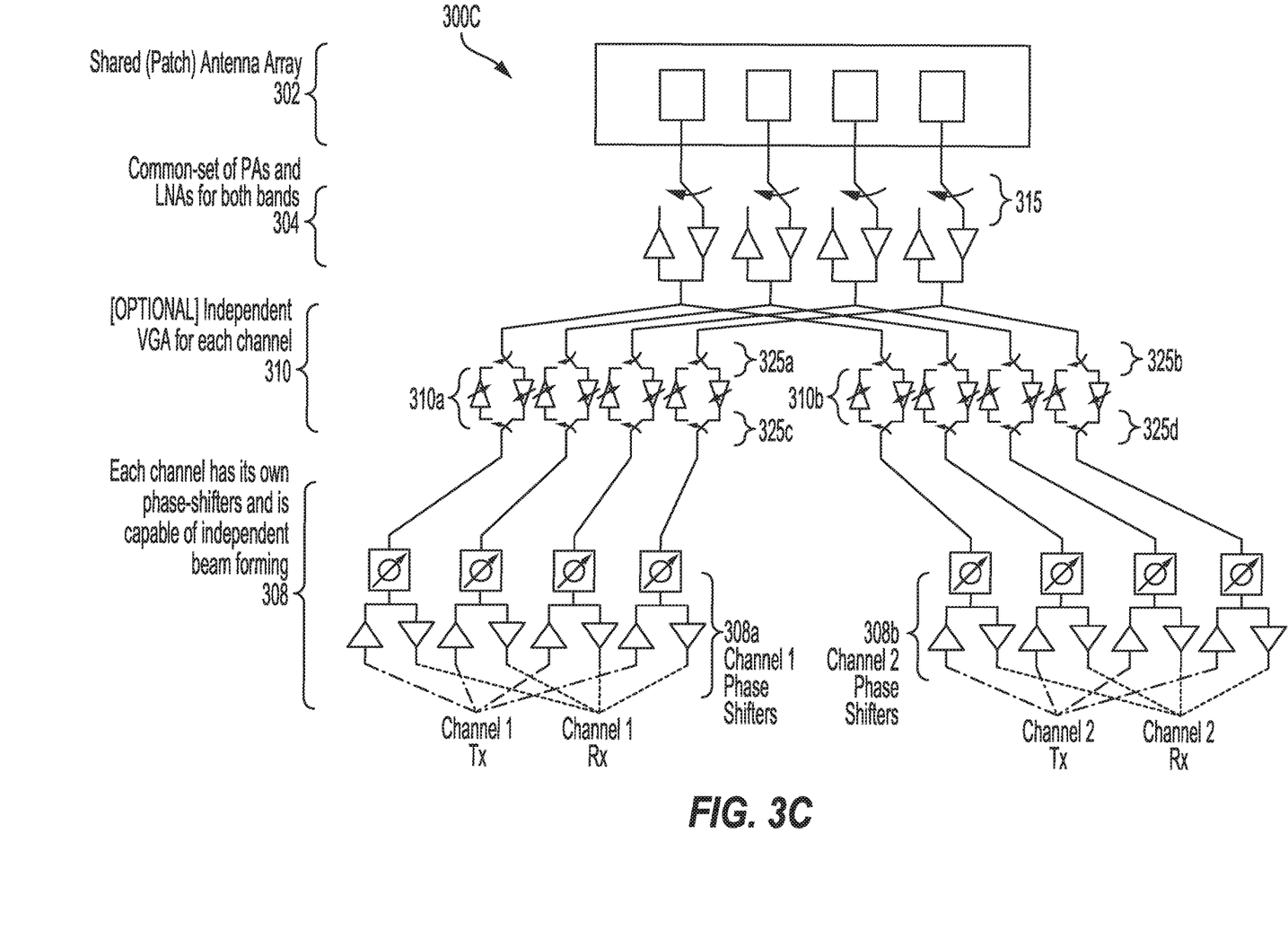

FIG. 3C illustrates an architecture for another multi-band (e.g., dual-band) concurrent millimeter wave (mmW) transceiver 300C. For illustrative purposes, some of the labelling and numbering of the devices and features of FIG. 3C are similar to those of FIG. 3A and FIG. 3B. In the absence of sufficient inter-band isolation, receive beam switching may be coordinated across bands. In comparison to other architectures, both Rx and Tx can form two beams. A set of amplifiers 304 (e.g., the PAs and/or LNAs) may be dual-band and may be shared between the first channel and the second channel.

Additional independent gain stages may be included for each channel. The gain stages may include variable gain amplifiers (VGAs) (e.g., inter-stage VGAs) 310 and corresponding variable gain transmit/receive (Tx/Rx) switches. For example, the first channel may be allocated a first set of variable gain amplifiers 310a and the second channel may be allocated a second set of variable gain amplifiers 310b. For example, the first channel may be allocated a first set of variable gain transmit/receive (Tx/Rx) switches 325a, 325c and the second channel may be allocated a second set of variable gain transmit/receive (Tx/Rx) switches 325b, 325d. The inter-stage VGAs 310 and phase shifters can be dual-band/broadband, or single-band providing some inter-band isolation. Physical interleaving of the signal paths for channel 1 and channel 2 may occur after the gain stages of common PA/LNA 302 and VGA 310, e.g., between gain stages 302, 310 and phase shifters 308, or between the gain stages, e.g., between common PA/LNA 304 and inter-stage VGAs 310. For example, physically interleaving a first frequency signal path and a second frequency signal path may occur after a gain stage when receiving and before a gain stage when transmitting.

Figure 4A:
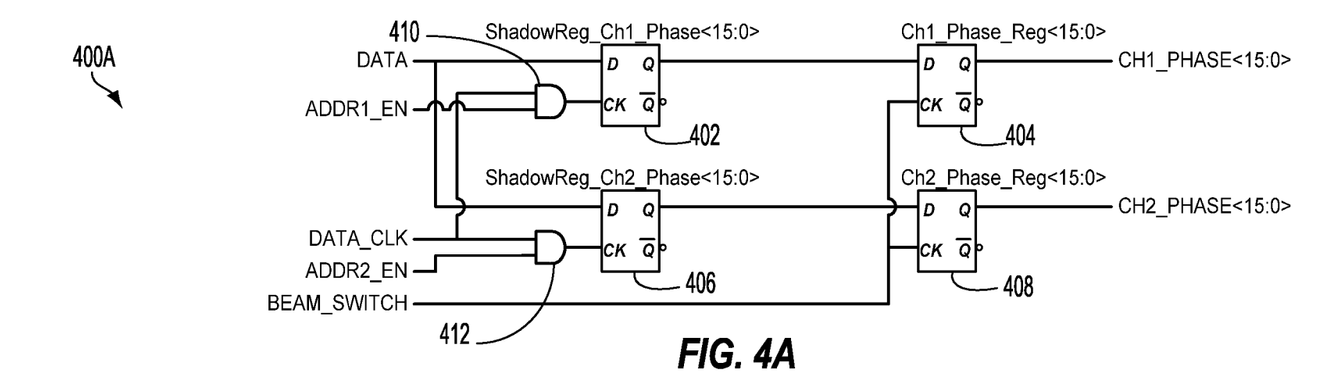
FIG. 4A illustrates a digital hardware circuit for steering multiple beams according to aspects of the present disclosure.

FIG. 4A illustrates a digital circuit 400A for steering multiple beams (e.g., a first beam and a second beam) according to aspects of the present disclosure. In a phased array, power from a transmitter is fed to antennas through phase shifters, controlled by the digital circuit 400A, which can alter a phase electronically, thus steering the beam of radio waves in a particular direction. The digital circuit 400A may include shift registers based on flip-flops (e.g., shadow registers 402 and 406 as well as state control registers 404 and 408) and logic gates (e.g., AND gates 410 and 412). The registers 402, 404 and the AND gate 410 may be allocated to channel 1 while the registers 406, 408 and the AND gate 412 are allocated to channel 2. Different signals illustrated by the graph in FIG. 4B are received by the digital circuit 400A to facilitate steering of the multiple beams (e.g., the first beam and the second beam).

Figure 4B:
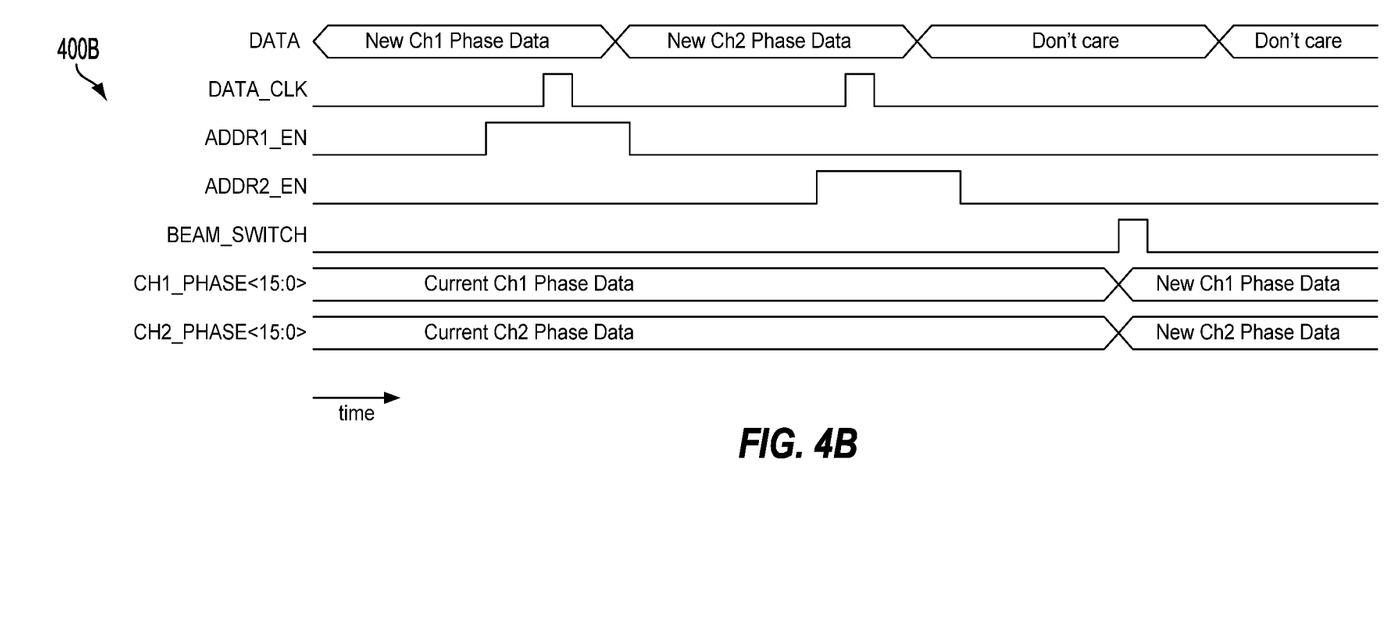
FIG. 4B is a timing diagram corresponding to multiple signals received by the digital circuit for steering multiple beams according to aspects of the present disclosure.

FIG. 4B is an example timing diagram 400B for the digital circuit 400A (or digital hardware circuit) illustrating multiple traces corresponding to multiple signals received by the digital circuit 400A with respect to time for steering multiple beams, according to aspects of the present disclosure. DATA represents data lines from an on-chip parallel data bus. For example, the data bus may be a data bus associated with a serial bus interface (SBI), a serial programming interface (SPI), an inter-integrated circuit (I2C), or a radio frequency front-end (RFFE) slave controller.

ADDR1_EN and ADDR2_EN are enable signals generated by the digital circuit or digital control circuit 400A. The ADDR1_EN is set to high when a write or read command is sent to a register (of the digital hardware) with an address value of ADDR1. The ADDR2_EN is set high when a write or read command is sent to the register with address value of ADDR2. In some serial programming interfaces, a command includes both address and data fields, as well as a read/write field. The address field in the serial programming command indicates which registers are being addressed.

DATA_CLK is an on-chip clock associated with DATA. The DATA_CLK is used to clock a value into the register being addressed. BEAM_SWITCH is an additional signal that may be generated by a general-purpose input/output (GPIO) or by writing to a special register. The BEAM_SWITCH transfers data from shadow registers into state control registers. In this example, there are sixteen (16) bits of phase control data for channel 1 and 16 bits of phase control data for channel 2. In addition to phase shifter control values, the data may include gain, bias current control, Tx/Rx mode selection, or other control signals for the millimeter wave (mmW) transceiver 300A, 300B, or 300C, which can be a phased-array transceiver.

ShadowReg_Ch1_Phase<15:0> and ShadowReg_Ch2_Phase<15:0> of FIG. 4A are example shadow registers where a control word value is preloaded but not applied to the circuit until contents of the shadow register are moved into state control registers. In this example, the registers and data held by the registers are each 16 bits. In some implementations, control of each channel may be implemented with four-bit phase shifters in conjunction with four phase shifters. This implementation results in a minimum control word size of 16 bits.

Ch1_Phase_Reg<15:0> and Ch2_Phase_Reg<15:0> of FIG. 4A are example state control registers. CH1_PHASE<15:0> and CH2_PHASE<15:0> of FIG. 4B are control words for controlling the settings of the phase shifters for channel 1 and channel 2, respectively. The digital bits CH1_PHASE<15:0> are coupled to digital control signals in the channel 1 phase shifters 308a, the channel 1 PAs and LNAs 304a, and the channel 1 independent VGA and T/R switches 310a, 325a, and 325c in the millimeter wave transceivers 300A, 300B, 300C. Likewise, the digital bits CH2_PHASE<15:0> are coupled to digital control signals in the channel 2 phase shifters 308b, the channel 2 PAs and LNAs 304b, and the channel 2 independent VGA and T/R switches 310b, 325b, and 325d in the millimeter wave transceiver 300A, 300B, 300C. The digital control signals are not shown in FIGS. 3A, 3B, and 3C to make the figures easier to read.

As is shown in the diagram 400B, to synchronize the control words for both channels in the dual-band concurrent transceiver, the control registers for channel 1 and channel 2 are both updated by a same update signal, in this case BEAM_SWITCH.

According to aspects of the present disclosure, the digital circuit 400A (e.g., digital hardware circuit) can switch a phase, a gain, bias, or ensure that a transmit/receive (Tx/Rx) mode is synchronized between the two channels associated with the first beam and the second beam. For example, switching of the gain, the phase, and the bias may be performed by the digital control circuit 400A by adjusting the control signals coupled to the phase shifters (e.g., the first set of phase shifters 308a and the second set of phase shifters 308b) and/or VGA (e.g., variable gain amplifiers 310a and 310b) to change the beam direction that should be synchronized between channel 1 and channel 2.

Figure 5A:
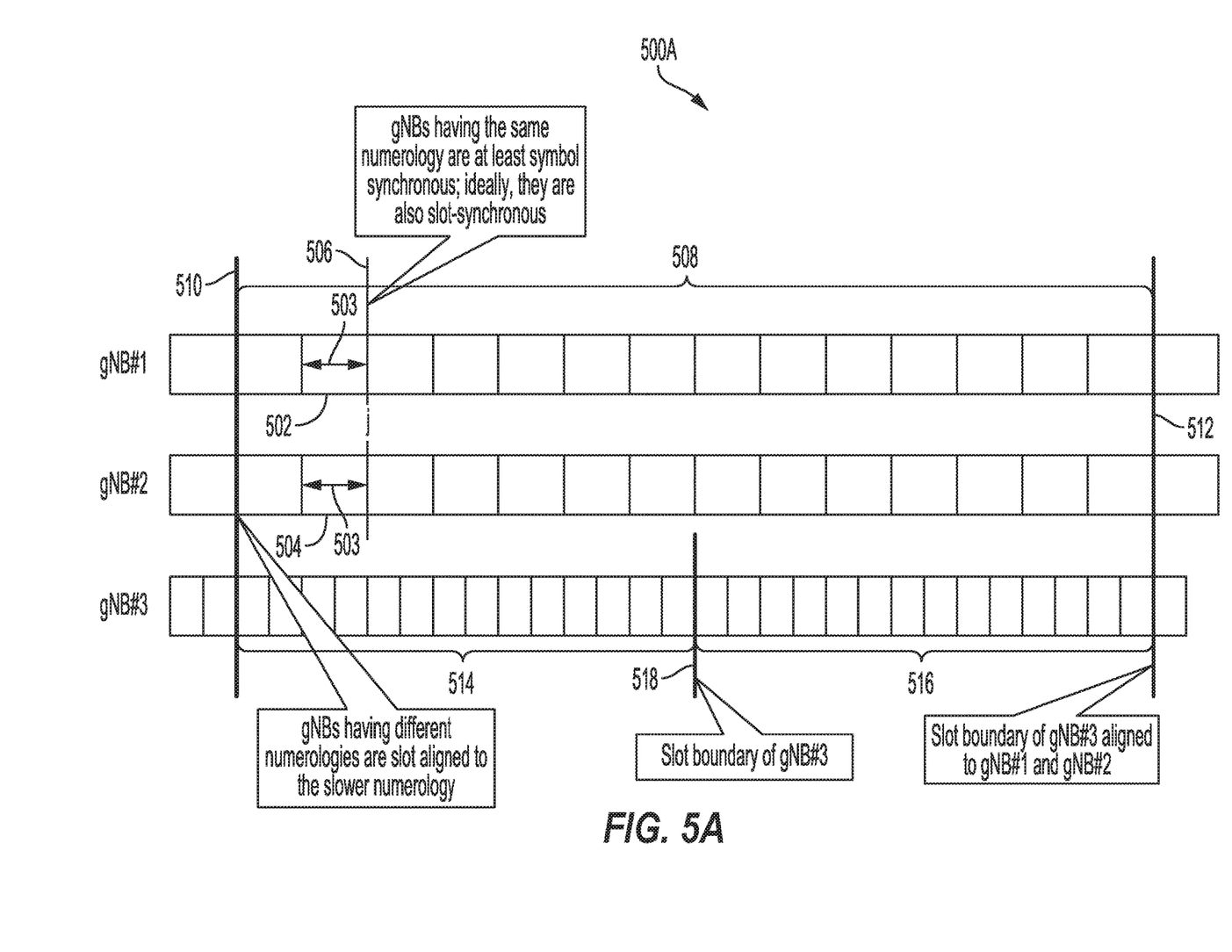
FIG. 5A illustrates exemplary timing for a set of gigabit node Bs (gNBs) maintaining timing synchronism at symbol boundaries of a largest symbol duration.

FIG. 5A illustrates exemplary timing 500A for a set of gigabit node Bs (gNBs) maintaining timing synchronism at symbol boundaries of a largest symbol duration. Gigabit node Bs having a same numerology (e.g., gNB#1 and gNB#2) can be symbol synchronous. For example, gNB#1 (including a symbol 502) and gNB#2 (including a symbol 504) have a same number of symbols of a same symbol duration 503 (as shown with respect to symbol 502 of gNB#1 and symbol 504 of gNB#2) in a same slot boundary 508. The symbol synchronism is illustrated by a coinciding time line 506 of each of the symbol 502 of gNB#1 and the symbol 504 of gNB#2. Ideally, the gNB#1 and gNB#2 are also configured to be slot-synchronous as illustrated by shared bounding time lines 510 and 512 corresponding to the same slot boundary 508.

However, gNBs having different numerology (e.g., a gNB#3) than the gNB#1 and the gNB#2 are slot aligned to a slower numerology. For example, the gNB#3 has a faster numerology relative to the gNB#1 and the gNB#2 and is configured to be slot aligned with the gNB#1 and the gNB#2, as illustrated by the time lines 510 and 512. A first slot 514 of the gNB#3 has a slot boundary between bounding time line 510 that it shares with the slots of the gNB#1 and the gNB#2 and a bounding time line 518. A second slot 516 of the gNB#3 has a slot boundary between the bounding time line 512 that it shares with the slots of the gNB#1 and the gNB#2 and the bounding time line 518. Thus, there is slot alignment between the slot boundary of the first and second slots of the gNB#3 and the slot boundary of the slots of the gNB#1 and the gNB#2.

Figure 5B:
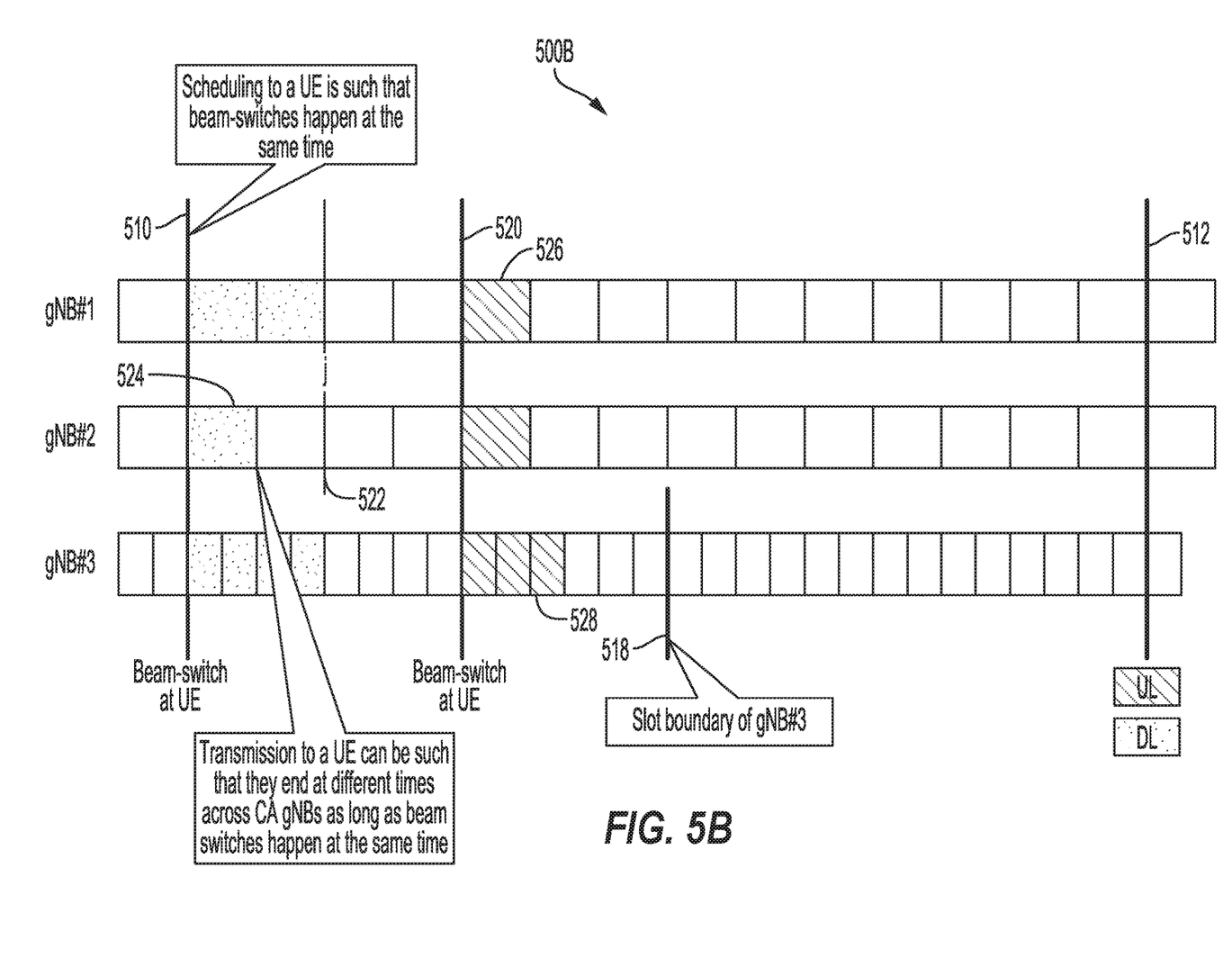
FIG. 5B illustrates exemplary timing for scheduling of transmit and receive opportunities for a user equipment across frequency bands or gigabit node Bs.

FIG. 5B illustrates exemplary timing 500B that shows scheduling of transmit and receive opportunities for a user equipment (UE) across frequency bands or gigabit node Bs (gNBs). For illustrative purposes, some of the labelling and numbering associated with FIG. 5B are similar to those of FIG. 5A. Beam switches at the UE in any frequency band do not need to happen when the other bands are engaged in transmission or reception. However, scheduling to the UE is such that beam switches occur at a same time. For example, a beam switch signal (e.g., based on BEAM_SWITCH) may synchronize beam switching for the gNB#1, gNB#2, and gNB#3 where beam switches occur at a same time for scheduled communication. For example, beam switching for scheduled downlink communication at the UE occurs at a same time (corresponding to the time line 510) for each of the gNB#1, gNB#2 and gNB#3. Similarly, beam switching for scheduled uplink communication at the UE occurs at a same time (corresponding to a time line 520) for each of the gNB#1, gNB#2, and gNB#3.

However, communication (e.g., transmission or reception) to the UE can end at different times across carrier aggregation gNBs as long as beam switching occurs at a same time. For example, downlink communication to the UE occurs at a same time (corresponding to a time line 522) for each of the gNB#1 and the gNB#3 but at a different time (e.g., corresponding to a time line 524) for the gNB#2. Similarly, uplink communication from the UE occurs at a same time (corresponding to a time line 526) for each of the gNB#1 and the gNB#2 but at a different time (e.g., corresponding to a time line 528) for the gNB#3.

Figure 6:
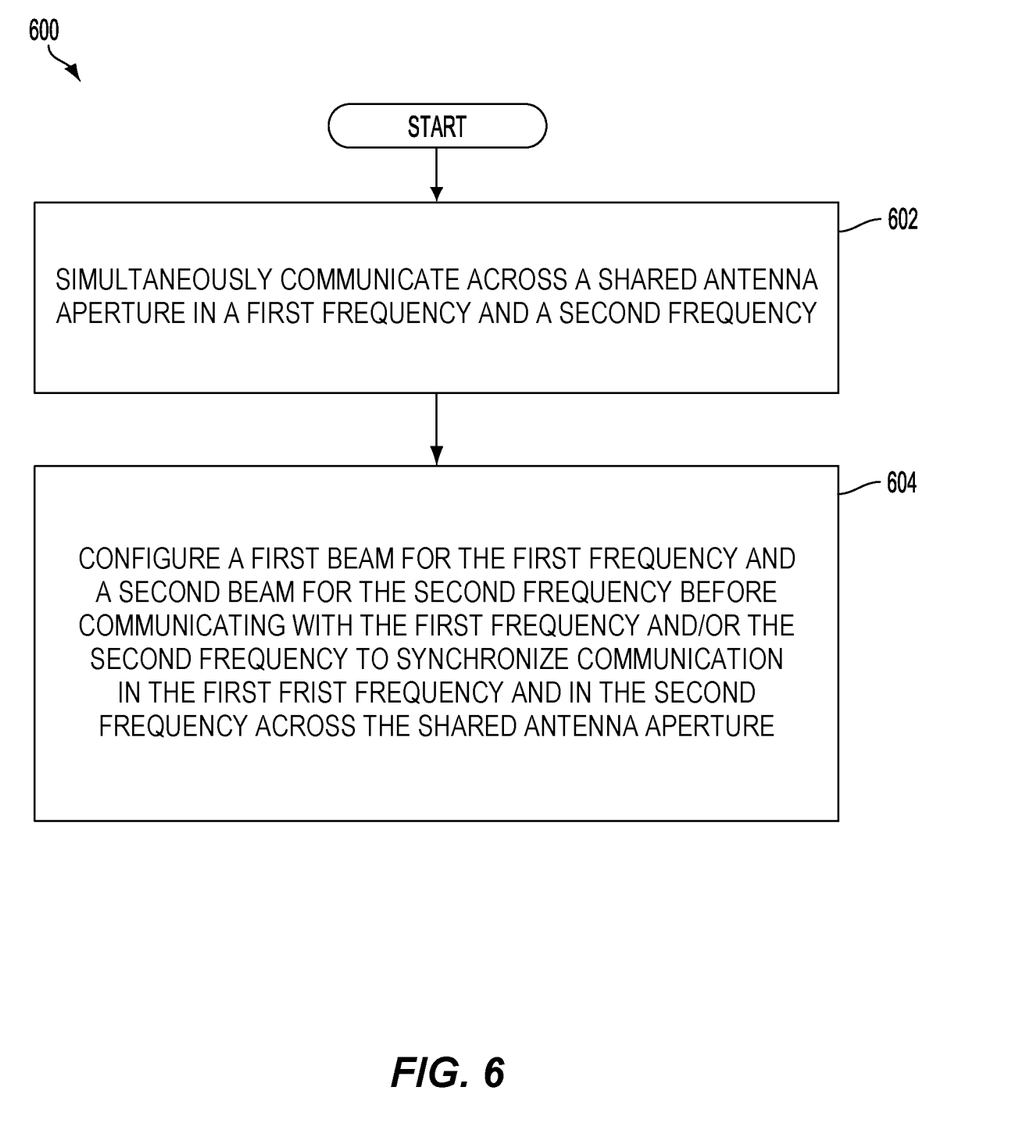
FIG. 6 depicts a simplified flowchart of a method of wireless communications according to aspects of the present disclosure.

FIG. 6 depicts a simplified flowchart of a method 600 for wireless communication. At block 602, a user equipment simultaneously communicates across a shared antenna aperture in a first frequency (e.g., first millimeter wave frequency) and a second frequency (e.g., a second millimeter wave frequency). For example, a single antenna aperture is used for communicating in the first frequency across the entire aperture and for communicating in the second frequency across the entire aperture rather than partitioning the aperture between the first frequency and the second frequency. At block 604, a first beam for the first frequency and a second beam for the second frequency are configured before communicating with the first frequency and/or the second frequency to synchronize communication in the first frequency and in the second frequency across the shared antenna aperture.

According to one aspect of the present disclosure, an architecture for another multi-band (e.g., dual-band) concurrent millimeter wave (mmW) apparatus (e.g., transceiver) is described. The apparatus includes means for simultaneously communicating across a shared antenna aperture in a first millimeter wave frequency and a second millimeter wave frequency. The apparatus further includes means for configuring a first beam for the first frequency and a second beam for the second frequency before communicating with the first frequency and/or the second frequency to synchronize communication in the first frequency and in the second frequency across the shared antenna aperture. The simultaneous communicating means may, for example, be the transceiver 220, the transceiver 222, the data processor/controller 280, the memory 282, the antenna 210, the antenna 212, the antenna array 302, the set of Pas and LNAs 304, the inter-band isolation 306, and/or the phase shifters 308. The configuring means may, for example, be the transceiver 220, the transceiver 222, the data processor/controller 280, the memory 282, the antenna 210, the antenna 212, the antenna array 302, the inter-band isolation 306, and/or the phase shifters 308. In another aspect, the aforementioned means may be any module or any apparatus or material configured to perform the functions recited by the aforementioned means.

Figure 7:
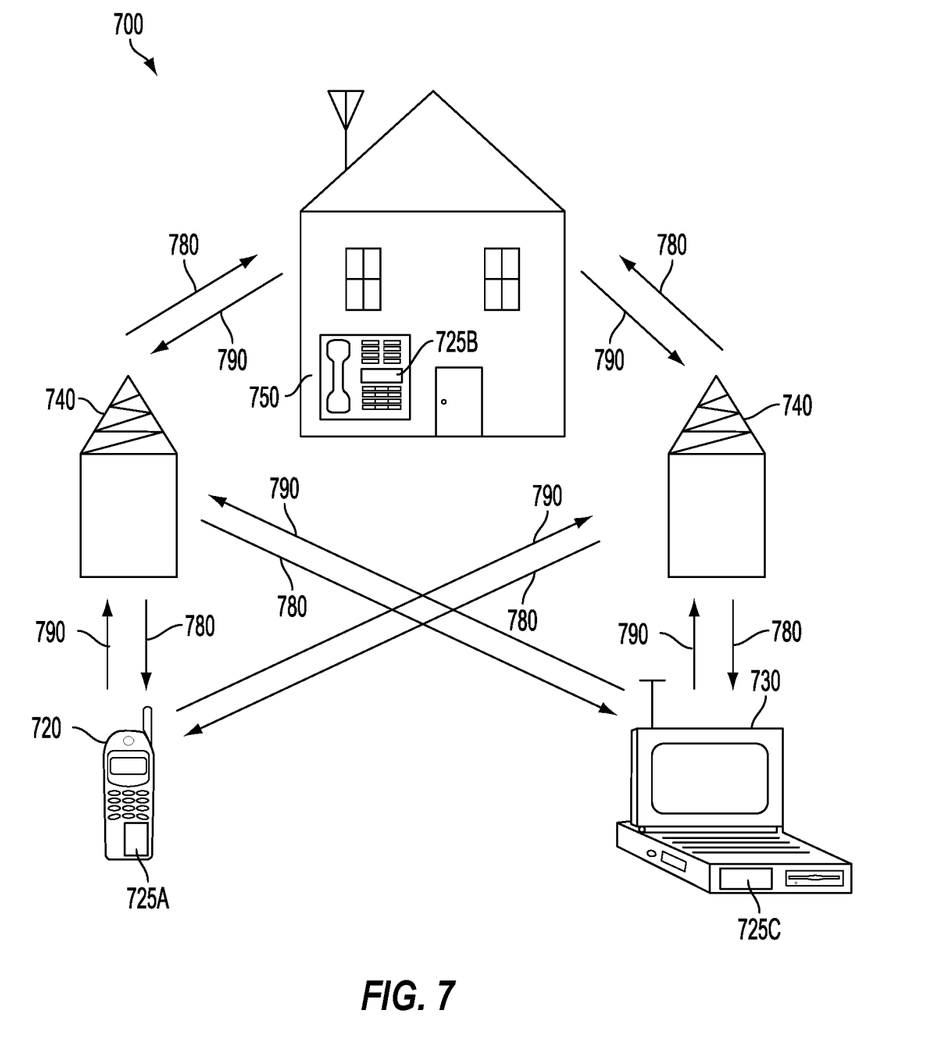
FIG. 7 is a block diagram showing an exemplary wireless communications system in which a configuration of the disclosure may be advantageously employed.

FIG. 7 is a block diagram showing an exemplary wireless communications system in which a configuration of the disclosure may be advantageously employed. For purposes of illustration, FIG. 7 shows three remote units 720, 730, and 750 and two base stations 740. It will be recognized that wireless communications systems may have many more remote units and base stations. Remote units 720, 730, and 750 include IC devices 725A, 725B, and 725C that include the disclosed transceiver. It will be recognized that other devices may also include the disclosed transceiver, such as the base stations, switching devices, and network equipment. FIG. 7 shows forward link signals 780 from the base station 740 to the remote units 720, 730, and 750 and reverse link signals 790 from the remote units 720, 730, and 750 to base station 740.

In FIG. 7, remote unit 720 is shown as a mobile telephone, remote unit 730 is shown as a portable computer, and remote unit 750 is shown as a fixed location remote unit in a wireless local loop system. For example, a remote unit may be a mobile phone, a hand-held personal communication systems (PCS) unit, a portable data unit such as a personal digital assistant (PDA), a GPS enabled device, a navigation device, a set top box, a music player, a video player, an entertainment unit, a fixed location data unit such as a meter reading equipment, or other communications device that stores or retrieves data or computer instructions, or combinations thereof. Although FIG. 7 illustrates remote units according to the aspects of the disclosure, the disclosure is not limited to these exemplary illustrated units. Aspects of the disclosure may be suitably employed in many devices, which include the transceiver.

For a firmware and/or software implementation, the methodologies may be implemented with modules (e.g., procedures, functions, and so on) that perform the functions described herein. A machine-readable medium tangibly embodying instructions may be used in implementing the methodologies described herein. For example, software codes may be stored in a memory and executed by a processor unit. Memory may be implemented within the processor unit or external to the processor unit. As used herein, the term "memory" refers to types of long term, short term, volatile, nonvolatile, or other memory and is not to be limited to a particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be an available medium that can be accessed by a computer. By way of example, and not limitation, such computer-readable media can include RAM, ROM, EEPROM, CD-ROM or other optical disk storage, magnetic disk storage or other magnetic storage devices, or other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

Although the present disclosure and its advantages have been described in detail, it should be understood that various changes, substitutions, and alterations can be made herein without departing from the technology of the disclosure as defined by the appended claims. For example, relational terms, such as "above" and "below" are used with respect to a substrate or electronic device. Of course, if the substrate or electronic device is inverted, above becomes below, and vice versa. Additionally, if oriented sideways, above and below may refer to sides of a substrate or electronic device. Moreover, the scope of the present application is not intended to be limited to the particular configurations of the process, machine, manufacture, and composition of matter, means, methods, and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding configurations described herein may be utilized according to the present disclosure. Accordingly, the appended claims are intended to include within their scope such processes, machines, manufacture, compositions of matter, means, methods, or steps.

What is claimed is:

1. A method for wireless communications, comprising:
   simultaneously communicating across a shared antenna aperture in a first frequency and a second frequency; and
   configuring a first beam for the first frequency and a second beam for the second frequency so that beam switching occurs at a same time as a slot boundary or a symbol boundary of a communications signal, the configuring occurring before communicating with the first frequency and/or the second frequency to synchronize communication between the first frequency and the second frequency across the shared antenna aperture.

2. The method of claim 1, in which configuring comprises:
   determining a time to steer the first beam; and
   synchronizing steering of the second beam with steering of the first beam.

3. The method of claim 2, in which steering further comprises, steering the first beam and the second beam at a same time when both the first frequency and the second frequency are receiving or transmitting.

4. The method of claim 1, further comprising determining a time to steer the first beam, in which steering further the first beam comprises steering the first beam when the second frequency is not receiving or transmitting.

5. The method of claim 1, in which simultaneously communicating comprises sharing an antenna array between the first frequency and the second frequency.

6. The method of claim 5, further comprising sharing a set of amplifiers, coupled to the antenna array, between the first frequency and the second frequency.

7. The method of claim 1, in which the first frequency and the second frequency are each allocated a phase shifter array for independent beamforming.

8. The method of claim 1, further comprising physically interleaving a first frequency signal path and a second frequency signal path after a gain stage when receiving and before the gain stage when transmitting.

9. An apparatus for wireless communications, comprising:
   a memory;
   a transceiver configured for wireless communication; and
   at least one processor coupled to the memory and the transceiver, the at least one processor configured:
      to simultaneously communicate across a shared antenna aperture in a first frequency and a second frequency; and
      to configure a first beam for the first frequency and a second beam for the second frequency so that beam switching occurs at a same time as a slot boundary or a symbol boundary of a communications signal, the configuring occurring before communicating with the first frequency and/or the second frequency to synchronize communication in the first frequency and in the second frequency across the shared antenna aperture.

10. The apparatus of claim 9, in which the at least one processor is further configured to synchronize communication by:
    determining a time to steer the first beam; and
    synchronizing steering of the second beam with steering of the first beam.

11. The apparatus of claim 10, in which the at least one processor is further configured to steer the first beam and the second beam at a same time when both the first frequency and the second frequency are receiving.

12. The apparatus of claim 10, in which the at least one processor is further configured to steer the first beam when the second frequency is not receiving.

13. The apparatus of claim 9, in which the at least one processor is further configured to simultaneously communicate through sharing an antenna array between the first frequency and the second frequency.

14. The apparatus of claim 13, in which the at least one processor is further configured to cause a set of amplifiers coupled to the antenna array to be shared between the first frequency and the second frequency.

15. The apparatus of claim 9, in which each of the first frequency and the second frequency are allocated a phase shifter array for independent beamforming.

16. The apparatus of claim 9, in which the at least one processor is further configured to physically interleave a first frequency signal path and a second frequency signal path after a gain stage when receiving and before the gain stage when transmitting.

17. An apparatus for wireless communications, comprising:
   inter-band isolation configured to enable simultaneously communicating across a shared antenna aperture in a first frequency and a second frequency; and
   means for configuring a first beam for the first frequency and a second beam for the second frequency so that beam switching occurs at a same time as a slot boundary or a symbol boundary of a communications signal, the configuring occurring before communicating with the first frequency and/or the second frequency to synchronize communication in the first frequency and in the second frequency across the shared antenna aperture.

18. The apparatus of claim 17, in which the configuring means further comprises:
   means for determining a time to steer the first beam; and
   means for synchronizing steering of the second beam with steering of the first beam.

19. The apparatus of claim 18, in which the synchronizing steering means further comprises, means for steering the first beam and the second beam at a same time when both the first frequency and the second frequency are receiving.

20. The apparatus of claim 17, in which the configuring means further comprises means for determining a time to steer the first beam, and means for steering the first beam when the second frequency is not receiving.

21. The apparatus of claim 17, in which the inter-band isolation comprises a duplexer having filters with complementary pass bands and stop bands.

22. The apparatus of claim 17, in which the inter-band isolation comprises:
   a set of parallel receive amplifiers configured to split a received signal into two approximately equal portions and independently buffer the signal to first channel phase shifters and second channel phase shifters; and
   a set of parallel transmit amplifiers configured to independently buffer the signal from the first channel phase shifters and the second channel phase shifters and then combine the signal.

23. The apparatus of claim 17, in which the inter-band isolation is configured to operate between amplification and phase shifting of the communications signal.

* * * * *